United States Patent
Ooi et al.

(10) Patent No.: US 6,831,804 B2
(45) Date of Patent: *Dec. 14, 2004

(54) METHOD AND APPARATUS FOR HANDLING RESONANCE EFFECTS IN DISC DRIVES USING ACTIVE DAMPING

(75) Inventors: Kian Keong Ooi, Singapore (SG); Ming Zhong Ding, Singapore (SG); Lee Ling Tan, Singapore (SG); Wing Kong Chiang, Singapore (SG); Beng Wee Quak, Singapore (SG); Yang Quan Chen, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 385 days.

This patent is subject to a terminal disclaimer.

(21) Appl. No.: 09/810,435

(22) Filed: Mar. 16, 2001

(65) Prior Publication Data

US 2002/0006009 A1 Jan. 17, 2002

Related U.S. Application Data

(60) Provisional application No. 60/212,545, filed on Jun. 20, 2000.

(51) Int. Cl.[7] .............................................. G11B 5/596
(52) U.S. Cl. ................................. 360/77.07; 360/77.07
(58) Field of Search ................................ 360/75, 77.07, 360/264.4; 700/30; 318/560, 611; 375/232

(56) References Cited

U.S. PATENT DOCUMENTS

| | | | |
|---|---|---|---|
| 4,217,612 A | 8/1980 | Matla et al. .................. 360/78 |
| 4,553,248 A | * 11/1985 | Reed .......................... 375/232 |
| 4,775,903 A | 10/1988 | Knowles ....................... 360/78 |
| 4,835,632 A | 5/1989 | Shih et al. ............... 360/78.04 |
| 4,839,876 A | 6/1989 | Fennema et al. ............. 369/32 |
| 4,894,599 A | 1/1990 | Ottesen et al. .............. 318/636 |
| 5,132,855 A | 7/1992 | Waugh et al. ........... 360/78.07 |
| 5,189,571 A | 2/1993 | Murphy et al. ................ 360/75 |
| 5,195,067 A | 3/1993 | Yanagi ........................ 369/32 |
| 5,305,158 A | 4/1994 | Ueda et al. .................... 360/75 |
| 5,459,383 A | * 10/1995 | Sidman et al. .............. 318/611 |
| 5,550,685 A | 8/1996 | Drouin |
| 5,680,272 A | 10/1997 | Kadlec et al. ........... 360/78.04 |

(List continued on next page.)

FOREIGN PATENT DOCUMENTS

| | | |
|---|---|---|
| EP | 0554125 B1 | 7/1997 |
| GB | 2344421 A | 6/2000 |
| JP | 08126370 A | 5/1996 |

OTHER PUBLICATIONS

U.S. patent application Ser. No. 09/788,065, Hai, filed Feb. 16, 2001.

*Primary Examiner*—David Hudspeth
*Assistant Examiner*—K. Wong
(74) *Attorney, Agent, or Firm*—David K. Lucente; Derek J. Berger

(57) ABSTRACT

A method of handling resonance effects on disc drives includes the steps of monitoring a position error signal (PES) for an actuator arm of a disc drive, generating a feedforward compensation signal from the PES using a bandpass filter, and applying the compensation signal to a servo control signal. The bandpass filter has a center frequency set to a known resonance frequency. A disc drive includes an actuator assembly including an arm for carrying a head in a transducing relation with respect to a disc in response to a control signal, and a controller that monitors a PES for the arm and generates the control signal. The controller includes a servo controller that generates a servo control signal from the PES, and a feedforward compensation element which bandpass filters the PES to generate a compensation signal which is combined with the servo control signal to generate the control signal.

19 Claims, 11 Drawing Sheets

OTHER PUBLICATIONS

| | | | |
|---|---|---|---|
| 5,859,742 A | | 1/1999 | Takaishi .................. 360/78.01 |
| 5,880,953 A | * | 3/1999 | Takeuchi et al. .............. 700/30 |
| 6,013,995 A | * | 1/2000 | Kim ........................... 318/561 |
| 6,122,125 A | | 9/2000 | Clare et al. |
| 6,125,008 A | * | 9/2000 | Berg et al. ................ 360/264.4 |
| 6,690,534 B2 | * | 2/2004 | Ding et al. ............... 360/77.02 |
| 2002/0041472 A1 | | 4/2002 | Ding et al. |

* cited by examiner

| Configuration | 1st Access time (ms) | 2nd Access time (ms) | 3rd Access time (ms) | 4th Access time (ms) |
|---|---|---|---|---|
| Without compensation, K=0 | 17.6 | 17.6 | 17.4 | 17.5 |
| With the devised compensation scheme, K=1 | 11.4 | 11.3 | 11.2 | 11.3 |
| With the devised compensation scheme, K=2 | 9.0 | 9.0 | 8.9 | 9.1 |

Fig. 11

METHOD AND APPARATUS FOR HANDLING RESONANCE EFFECTS IN DISC DRIVES USING ACTIVE DAMPING

RELATED APPLICATIONS

This application claims the benefit of U.S. Provisional Application Ser. No. 60/212,545, filed on Jun. 20, 2000 under 35 U.S.C. § 119(e).

FIELD OF THE INVENTION

The present invention relates to the field of mass storage devices. More particularly, this invention relates to a method and apparatus for handling resonance effects in disc drives using active damping.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer head to various locations over the disc, and electrical circuitry that is used to write and read data to and from the disc. The disc drive also includes circuitry for encoding data so the data can be successfully retrieved from and written to the disc surface. A microprocessor controls most of the operations of the disc drive as well as passing the data back to the requesting computer and accepting data from a requesting computer for storing to the disc.

The transducer head is typically placed on a small ceramic block, referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the transducer head away from the disc. At the same time, the air rushing past the cavity or depression in the ABS produces a negative pressure area. The negative pressure or suction counteracts the pressure produced at the rails. The slider is also attached to a load spring which produces a force on the slider that is directed toward the disc surface. The various forces equilibrate so that the slider flies over the surface of the disc at a particular desired fly height. The fly height is the distance between the disc surface and the transducing head, which is typically equal to the thickness of the air lubrication film. This film eliminates the friction and the resulting wear that would occur if the transducing head and the disc were to be in mechanical contact during the disc rotation. In some disc drives, the slider passes through a layer of lubricant rather than flying over the surface of the disc.

Information representative of data is stored on the surface of the storage disc. Disc drive systems read and write information stored on tracks on the storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto the track by writing information representative of data onto the storage disc. Similarly, reading data from a storage disc is accomplished by positioning the read/write head above a target track and reading the stored material on the storage disc. To write on or read from different tracks, the read/write head is moved radially across the tracks to a selected target track. The data is divided or grouped together on the tracks. Some disc drives have a multiplicity of concentric circular tracks. In other disc drives, a continuous spiral is one track on one side of drive. Servo feedback information is used to accurately locate the transducer head. The actuator assembly is moved to the required position and held very accurately during read or write operations using the servo information.

The actuator is rotatably attached to a shaft via a bearing cartridge which generally includes one or more sets of ball bearings. The shaft is attached to the base of the disc drive, and may also be attached to the top cover of the disc drive. A yoke is attached to the actuator. A voice coil is attached to the yoke at one end of the rotary actuator. The voice coil is part of a voice coil motor (VCM) used to rotate the actuator and the attached transducer(s). A permanent magnet is attached to the base and the cover of the disc drive. The VCM which drives the rotary actuator comprises the voice coil and the permanent magnet. The voice coil is attached to the rotary actuator and the permanent magnet is fixed on the base. The yoke is generally used to attach the permanent magnet to the base and to direct the flux of the permanent magnet. Since the voice coil sandwiched between the magnet and the yoke assembly is subjected to magnetic fields, electricity can be applied to the voice coil to drive the voice coil so as to position the transducer(s) at a target track.

Two of the ever constant goals of disc drive designers are to increase the data storage capacity of disc drives, and to decrease the amount of time needed to access the data. To increase storage capacity, current disc drives have increased numbers of tracks per inch (TPI). Put simply, current disc drives squeeze more tracks onto the same size disc. Decreasing the amount of time needed to access the data can be thought of as increasing the speed at which data is retrieved. Increasing the speed at which data is retrieved is very desirable. Any decreases in access time increase the speed at which a computer can perform operations on data. When a computer system is commanded to perform an operation on data that must be retrieved from disc, the time needed to retrieve the data from the disc is often the bottleneck in the operation. When data is accessed from a disc more quickly, more transactions can generally be handled by the computer in a particular unit of time.

A rotating disc data storage device uses a servo system to perform two basic operations: track seeking and track following. Track seeking refers to the ability of the disc drive and the servo system to move the read/write transducer head of the disc drive from an initial track to a target track from which data is to be read, or to which data is to be written. The settling of the transducer head at the target track is referred to as seek settling. Track following, which is performed after the head has been aligned with a target track, refers to the ability of the disc drive and the servo system to maintain the read/write head positioned over the target track. Note that, to effectively perform track seeking and track following in a disc drive with increased TPI, the servo open loop bandwidth of the system must also be pushed or increased.

Structural resonance in disc drives is one of the major challenges faced by disc drive designers in general, and disc drive servo control designers in particular. The structural resonance, such as arm bending mode resonance and coil bending mode resonance, will introduce problems in the operation of a disc drive's VCM during seek settling and even during track following. Due to structural resonance, the position error signal (PES) for the actuator arm of a disc drive will oscillate during seek settling and track following, thus adversely affecting the settling time and the drive performance of the disc drive. The effects of structural resonance are getting worse with yearly increases in the number of TPI and in the servo bandwidth of the disc drives. As the number of TPI increases, the tracks become thinner and therefore it becomes crucial for the disc drives to minimize or eliminate resonance which can cause the actuator arm to swing to off-track positions when the actuator resonates during seek settling or track following. As the servo bandwidth increases, the susceptibility of the actuator to vibrations induced at the actuator's resonant frequency increases, which may result in greater off-track disturbances of the heads.

While a certain amount of resonance is acceptable, the acceptable amount of resonance decreases as the number of TPI, and the servo bandwidth, increase. If the resonance is reduced or eliminated, the number of missed revolutions of the disc will be minimized and the access times will decrease. Reducing resonance will also help improve a disc drive's through-put performance. If resonances in the actuator arm at frequencies associated with normal operation of the disc drive are reduced or eliminated, seek settling and track following will also be improved since the servo system will not be attempting to counter the effects of a resonating arm swinging across a desired track from an off-track position on one side to an off-track position on the other side of the desired track during the track settling or track following.

A common approach for addressing the structural resonance problem is to include an analog or digital notch filter to attenuate the resonant modes at particular frequencies. The control signal from the servo controller is passed through the notch filter before driving the VCM. Unfortunately, due to the nature of notch filters, the notch-filter approach introduces a large phase lag around the notch center frequency. Thus, while this approach is often used in disc drives when the resonance frequency is high compared to the servo bandwidth, the notch-filter approach is not applicable for handling resonance frequencies in disc drives that are near the servo open loop gain crossover frequency since the notch filter would cause an unacceptable phase margin drop. For example, the resonance frequencies of the arm bending mode and the coil bending mode resonance are about 700 Hz and 1000 Hz, respectively, which are both near the servo open loop gain crossover frequency. Thus, these structural resonance modes can cause problems in the track seeking and following operations which are not adequately addressed by the notch-filter approach. The seek settling and track following problems are worse if these frequencies coincide. Therefore, the notch-filter approach is not useful or adequate for handling certain resonance modes.

Therefore, what is needed is an improved method and apparatus for handling resonance effects in disc drives. There is also a need for a method and apparatus for handling resonance effects in disc drives which improves seek settling and/or track following in the disc drives, and may be used with disc drives that have increased numbers of TPI and increased servo bandwidths. There is also a need for a method and apparatus for handling structural resonance effects in disc drives that have resonance frequencies at or near the servo open loop gain crossover frequency of the disc drives. There is also a need for a method and apparatus for handling both high and low resonance frequencies in disc drives without loss of drive performance.

SUMMARY OF THE INVENTION

The present invention relates to a method and apparatus which use active damping for handling resonance effects in disc drives. Advantageously, this active damping approach can handle resonance effects which occur at either high or low frequencies without adversely affecting the performance of the disc drives. For example, the active damping approach of the present invention can handle structural resonance frequencies that may exist at or near the servo open loop gain crossover frequency of the disc drives, including both arm and coil bending mode resonances.

In accordance with one embodiment of the present invention, a method of handling a resonance effect on a disc drive includes the steps of monitoring a position error signal (PES) for an actuator arm of a disc drive, generating a feedforward compensation signal from the position error signal using a bandpass filter, and applying the feedforward compensation signal to a servo control signal. The bandpass filter has a center frequency that is set to a predetermined resonance frequency of the disc drive.

In one embodiment of this method, the monitoring step includes receiving a sensed position signal from a transducer coupled to the actuator arm, and subtracting the sensed position signal from a reference position signal. The bandpass filter has a center frequency that is set to a predetermined resonance frequency that appears during seek settling and/or track following. The generating step includes using a gain element with the bandpass filter to generate the feedforward compensation signal. The gain element provides a constant gain equal to the gain of the controller which generates the servo control signal at the predetermined resonance frequency. The applying step includes subtracting the feedforward compensation signal from the servo control signal, thereby achieving a phase advance in the open loop bode measurements. The method further includes providing the compensated servo control signal to an actuator assembly for actuating the actuator arm.

In accordance with another embodiment of the invention, a disc drive device includes a base, a disc rotatably attached to the base, an actuator assembly with an arm for carrying a transducer head in a transducing relation with respect to the disc in response to a control signal, and a controller coupled to the actuator assembly for monitoring a position error signal (PES) for the arm and for generating the control signal. The controller includes a servo controller that monitors the position error signal for the arm and generates a servo control signal from the position error signal, and also includes a feedforward compensation element, including a bandpass filter, that filters the position error signal to generate a compensation signal and combines the compensation signal with the servo control signal to generate the control signal. The bandpass filter has a center frequency set to a predetermined resonance frequency of the disc drive device.

In one embodiment of this disc drive device, the servo controller monitors the position error signal by receiving a sensed position signal from the transducer head, and subtracting the sensed position signal from a reference position signal. The bandpass filter has a center frequency that is set to a predetermined resonance frequency of the disc drive device which appears during seek settling and/or track following. The compensation element includes a gain element which provides a constant gain equal to the gain of the servo controller at the resonance frequency. The compensation element further includes a subtraction element for subtracting the compensation signal from the servo control signal to generate the control signal.

In accordance with another embodiment of the invention, an apparatus for handling a resonance effect on a disc drive includes means for monitoring a position error signal for an actuator arm of the disc drive, means for generating a feedforward compensation signal from the position error signal using a bandpass filter having a center frequency set to a predetermined resonance frequency of the disc drive, and means for applying the feedforward compensation signal to a servo control signal.

In accordance with another embodiment of the present invention, a disc drive includes a base, and an actuator arm and disc rotatably attached to the base. The arm carries a transducer head in a transducing relation with respect to the disc. The disc drive also includes means for handling a resonance effect using active damping.

These and various other features as well as advantages which characterize the present invention will be apparent to a person of ordinary skill in the art upon reading the following detailed description and reviewing the associated drawings.

BRIEF DESCRIPTION OF THE DRAWINGS

FIG. 11 is a chart showing measured write settling access times for the disc drive control loop shown in FIG. 6, with gain K set to different values (i.e., 0, 1, 2);

DESCRIPTION OF THE PREFERRED EMBODIMENTS

Figure 1:
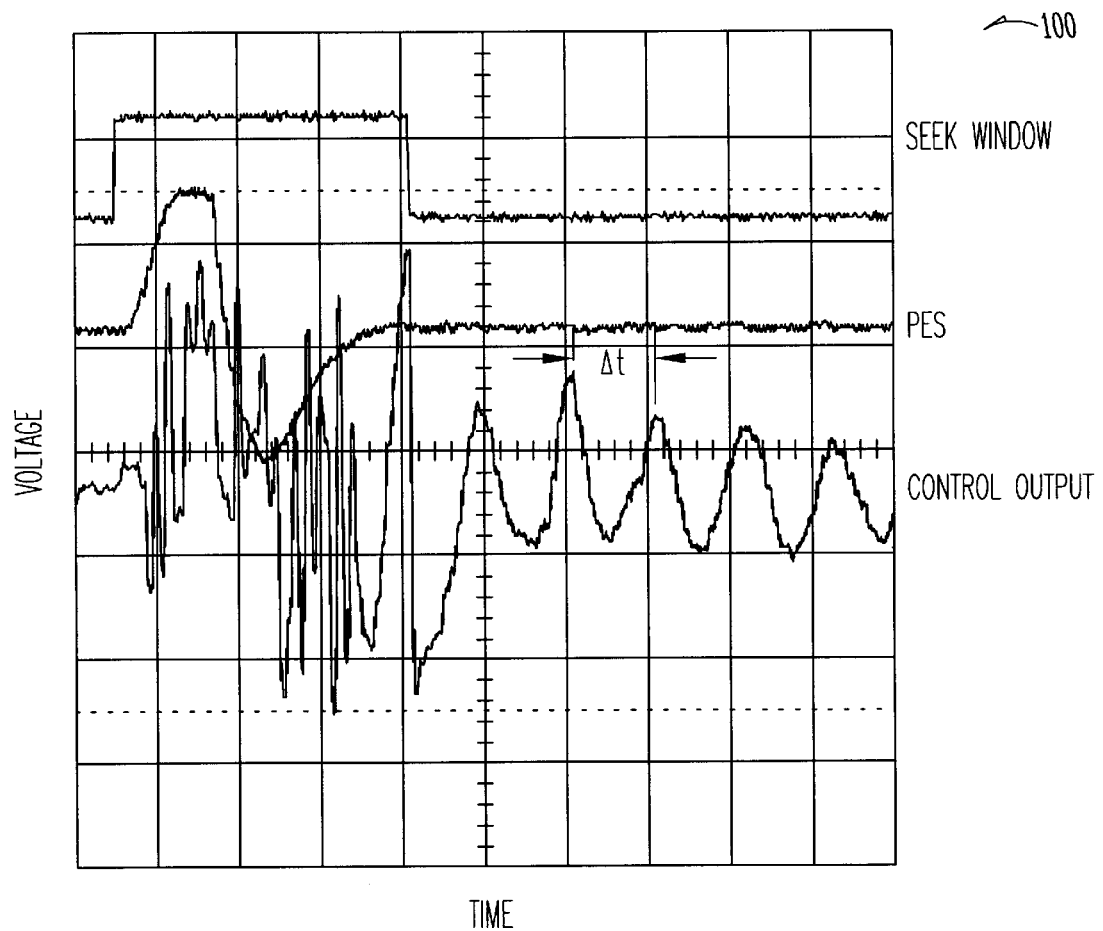
FIG. 1 is a graph illustrating the oscillation of the position error signal (PES) during seek settling on a conventional disc drive.

In the following detailed description of the preferred embodiments, reference is made to the accompanying drawings which form a part hereof, and in which are shown by way of illustration specific embodiments in which the invention may be practiced. It is to be understood that other embodiments may be utilized and that structural changes may be made without departing from the scope of the invention.

In this application, a method and apparatus for handling resonance effects on disc drives using active damping are described. For a known resonance frequency that appears during seek settling (e.g., after a short seek), or during track following, this active damping technique monitors a position error signal (PES) for the actuator arm of a disc drive, generates a feedforward compensation signal from the position error signal using a bandpass filter, and applies the compensation signal to a servo control signal for the VCM (e.g., by subtracting the compensation signal from the control signal). This technique effectively handles resonance effects on both track seeking and track following operations without sacrificing disc drive performance.

In the following description, the active damping technique of the present system is described as being used for effectively handling the arm bending mode resonance of a disc drive. This resonance mode has a resonance frequency of about 1000 Hz (more specifically, about 930 Hz for an exemplary disc drive). Since this resonance frequency is near the servo open loop gain crossover frequency of the disc drive, the conventional notch-filter approach for handling resonance is inapplicable. It should be understood, however, that the active damping technique of the present system can also be used to handle other resonance modes, including other resonance modes having high or low resonance frequencies with respect to the servo open loop gain crossover frequency of the disc drive. For example, this technique can handle the coil bending mode resonance of a disc drive, which has a resonance frequency of about 700 Hz. Before describing the active damping technique of the present system in more detail, the characteristics of the arm bending mode resonance are described.

The arm bending mode resonance has the characteristic of zone-dependence, which is due to several factors. First, magnet flux across the coil will no longer form straight lines around the two ends of the magnet. The situation will be worse if only a single magnet is used. Second, skew angle will be different at different zones. For example, at inner diameter (ID), skew angle will be about 0 degrees. Therefore, the actuator arm will be tangential to the track, and resonant bending motion along the arm will have no or only a small component across the track. At outer diameter (OD), skew angle will not be zero. Thus, the resonant bending motion along the arm will have a component across the track. As for middle diameter (MD), since the magnet flux across the coil will be straight, less bending mode resonance will occur.

The arm bending mode resonance will cause oscillation of the position error signal (PES) during seek settling. This resonant mode will be excited during seek operations, especially during short seeks in which the VCM is accelerated and then decelerated rapidly as the transducing head is moved from an initial to a target track. Therefore, the position error signal will exhibit oscillation during seek settling, thus resulting in a longer settling time. The oscillation of the position error signal during a typical seek operation on a conventional disc drive is shown by graph 100 in FIG. 1. The top trace in FIG. 1 represents the seek window, the middle trace represents the position error signal, and the bottom trace represents the control signal driving the VCM. The oscillatory frequency of the position error signal is about 930 Hz (i.e., the arm bending mode resonance frequency). The oscillation in the position error signal causes the control signal to oscillate with a period t, wherein 1/t=930 Hz. As can be seen, the oscillations cause the seek settling time to be relatively long.

Figure 2:
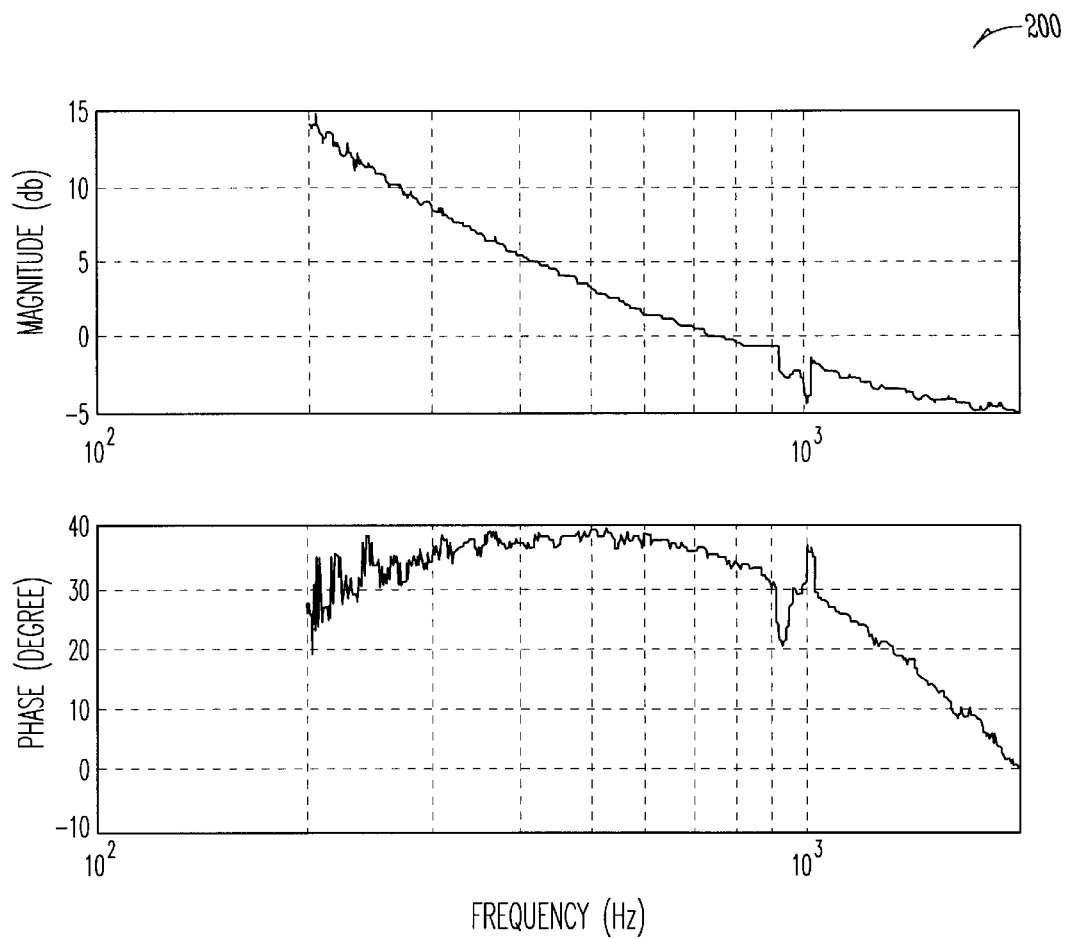
FIG. 2 is an open loop bode plot illustrating the effect of arm bending mode resonance on gain and phase for the conventional disc drive.
Figure 3:
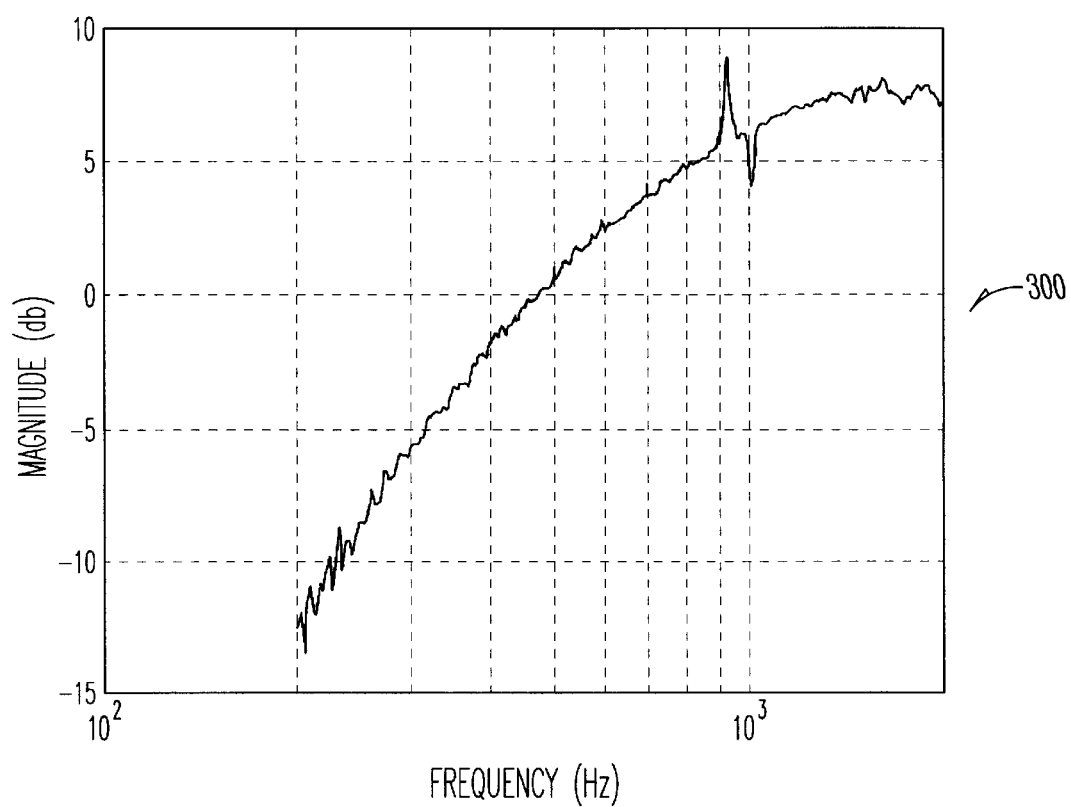
FIG. 3 is a sensitivity function plot illustrating the arm bending resonance mode at a particular resonance frequency for the conventional disc drive.

Referring to FIG. 2, the effect of arm bending mode resonance on gain and phase for the conventional disc drive is shown by the open loop bode plot 200. The characteristics of this particular resonance mode include introducing a phase loss at the resonance frequency (see the drop in phase at about 930 Hz in the lower graph). Referring to FIG. 3, the sensitivity function plot 300 shows the resonance mode at about 930 Hz, which coincides with the PES oscillatory frequency shown in FIG. 1.

Thus, the position error signal (PES) has the characteristic of having a 930 Hz oscillation. The position error signal results from relative motion of the actuator arm with respect to the track to be followed. Note that, for writing data to the track, or reading data from the track, the actuator arm needs to follow the track. Thus, if the position error signal oscillation is caused by resonant motion of the actuator arm itself, the resonance needs to be rejected. As discussed above, the commonly-used method for rejecting resonance is to include a notch filter having a center frequency that matches the resonance frequency. However, the nature of the notch filter itself limits the application of the notch-filter approach to handling resonance frequencies that are high in relation to the servo open loop bandwidth, because the notch filter will introduce unacceptable phase loss at lower frequencies. For resonance modes having resonance frequencies at or near the servo open loop bandwidth, such as the arm or coil bending mode resonance, the notch-filter approach is not applicable. For example, since the 930 Hz resonance frequency of the arm bending mode resonance is near the servo open loop bandwidth, using a notch filter to handle the resonance effect of the arm bending mode resonance will unacceptably reduce phase margin.

In one conventional disc drive, arm bending mode resonance is handled in a "passive" manner using a self-adaptive seeking profile. In this passive scheme, the whole surface of the disc is partitioned into several zones. At each zone, short seeks are executed, and the settling time of the seeks is checked. If the settling time for a zone is too long, the seeking profile for the zone is lowered down (i.e., made slower) by a certain percentage and a re-test of the settling time for the zone is performed. A compensation count is maintained to indicate the number of times that the seeking profile is lowered down, and the count is then used for subsequent seeks to insure that the settling time is adequately fast. This passive scheme works reasonably well since the PES oscillation during seek settling is due to the excitation during seeking. However, this self-adaptive seeking profile scheme sacrifices the seeking time for a better settling time which may, in turn, provide the benefit of a faster access time.

In contrast, the present invention handles resonance effects in disc drives in an "active" manner without sacrificing seeking time. The present invention can be used with all mechanical configurations of disc drives having either rotary or linear actuation. Also, the present invention is useful in all types of disc drives including hard disc drives, zip disc drives, floppy disc drives and any other type of disc drives. Thus, while the discussion below focuses on one particular type of disc drive, it should be understood that the present invention is not limited to this particular type.

Figure 4:
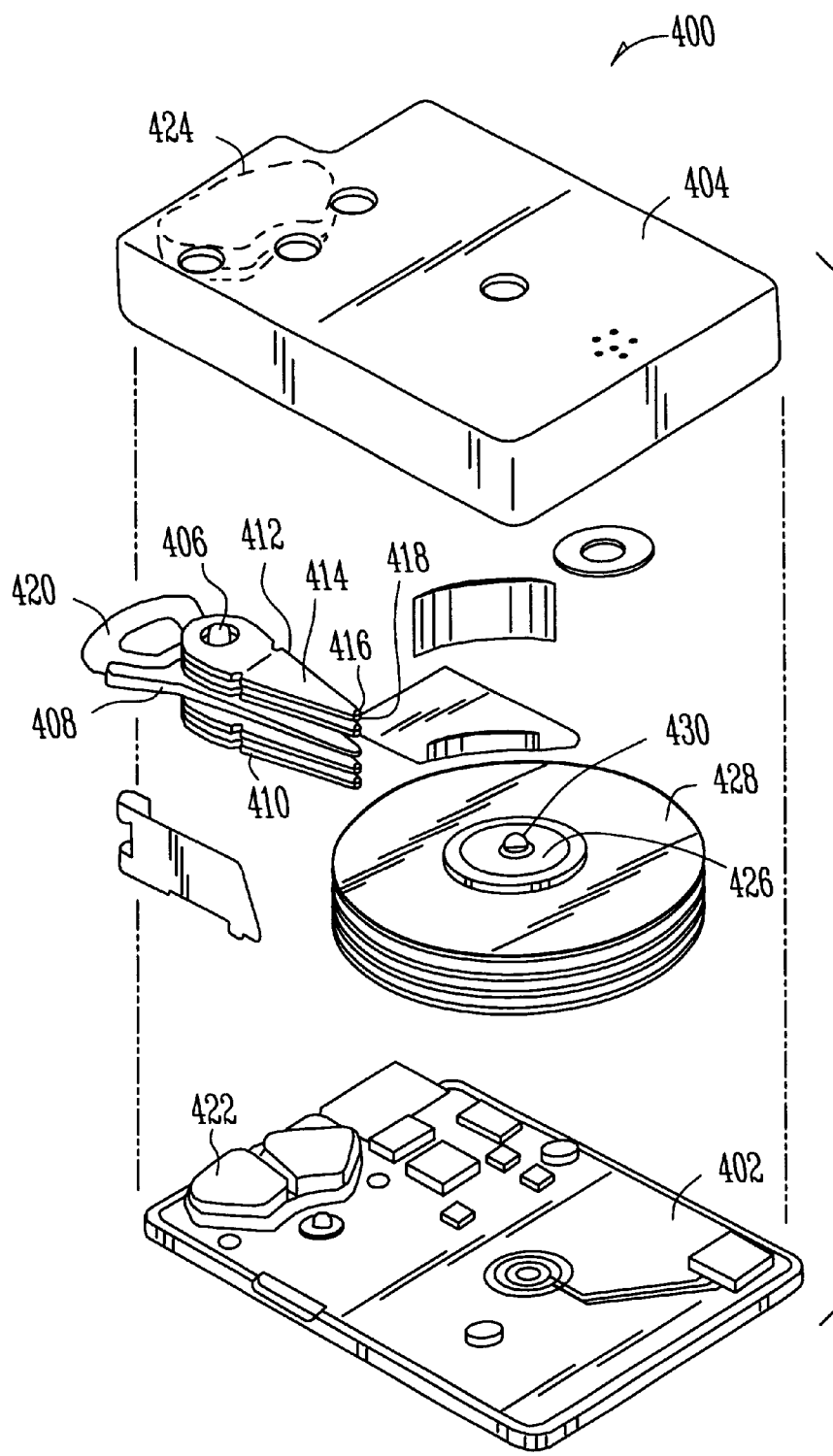
FIG. 4 is an exploded view of a disc drive with a multiple disc stack in accordance with one embodiment of the present invention.

Referring now to FIG. 4, a disc drive 400 having a rotary actuator includes a housing having a base 402 and a cover 404 which form a disc enclosure. Rotatably attached to base 402 on an actuator shaft 406 is a rotary actuator assembly 408. Rotary actuator assembly 408 includes a comb-like structure 410 having a plurality of arms 412. Attached to separate arms 412 on comb 410 are load beams or load springs 414. Load beams or load springs 414 are also referred to as suspensions. Attached at the end of each load spring 414 is a slider 416 which carries a magnetic transducer 418. Slider 416 and transducer 418 form what is often referred to as the head. It should be noted that many sliders have one transducer 418 and that is what is shown in the figures. It should also be noted that the present system is equally applicable to sliders having more than one transducer, such as what is referred to as a magneto-resistive (MR) head in which one transducer is generally used for reading and another transducer is generally used for writing. On the end of rotary actuator assembly 408 opposite load springs 414 and sliders 416 is a voice coil 420.

Attached within the disc enclosure between base 402 and cover 404 is a first magnet 422 and a second magnet 424. As shown, first and second magnets 422 and 424 are associated with base 402 and cover 404, respectively. First magnet 422, second magnet 424 and voice coil 420 are the key components of a voice coil motor (VCM) that applies a force to actuator assembly 408 to rotate actuator assembly 408 about actuator shaft 406. Also mounted to base 402 is a spindle motor. The spindle motor includes a rotating portion called a spindle hub 426. In this particular disc drive, the spindle motor is located within spindle hub 426. In FIG. 4, a number of discs 428 are shown as attached to spindle hub 426. In other disc drives, a single disc or a different number of discs from that shown in FIG. 4 may be attached to the hub. The system described herein applies equally to disc drives having a plurality of discs and disc drives having a single disc, and is also equally applicable to disc drives with spindle motors which are within hub 426 or under hub 426. Discs 428 are rotatably attached to base 402 through a shaft 430 (and by hub 426). Actuator assembly 408 carries transducer 418 in a transducing relation with respect to one of discs 428 for reading and writing data to that disc 428 during operation of drive 400.

Figure 5:
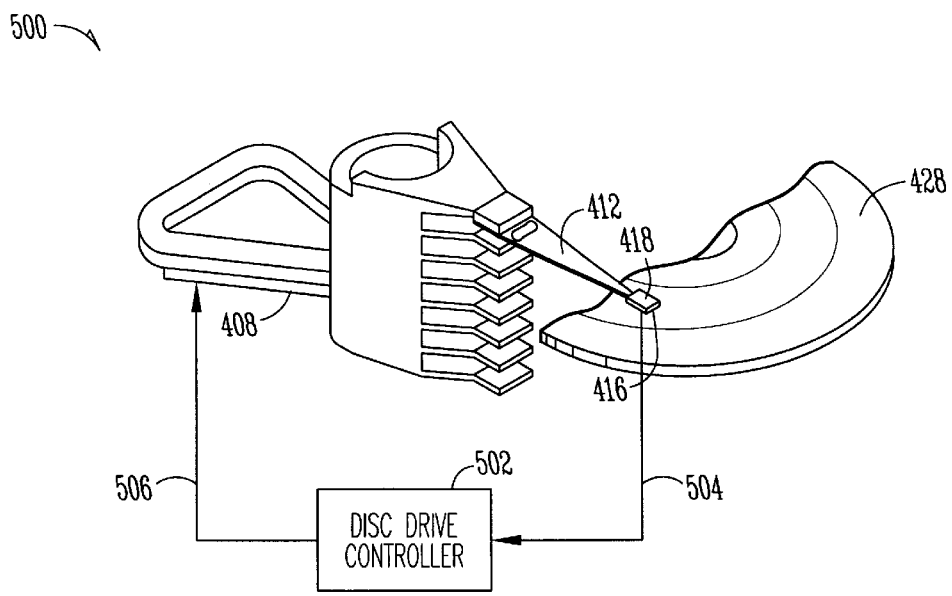
FIG. 5 is a schematic representation of a servo control system of the disc drive shown in FIG. 4.

FIG. 5 is a schematic representation of a servo control system 500 for disc drive 400 which includes a disc drive controller 502. Controller 502 is coupled to transducer 418 to receive input signals 504 representing positions of transducer 418. Controller 502 is also coupled to actuator assembly 408 to provide signals to control the rotation of assembly 408, thereby also controlling the position of transducer 418. Thus, system 500 provides closed-loop control over the position of transducer 418. By providing appropriate control signals 506 to actuator assembly 408, controller 502 performs both track seeking and track following functions. In the track seeking function, the read/write head including transducer 418 is moved from an initial track on disc 428 into radial alignment with a target track on disc 428 from which data is to be read or to which data is to be written. In the track following function, which is performed when the head reaches a selected track, the read/write head is maintained in radial alignment with the selected track defined on disc 428 as disc 428 rotates, so that transducer 418 can read data from, or write data to, the selected track. As noted above, the track settling and even the track following functions may be subject to adverse effects due to structural resonances in disc drive 400 that can cause arms 412 to resonate when actuator assembly 408 is moved. However, by providing active damping as described below, such resonances can be reduced or eliminated.

Figure 6:
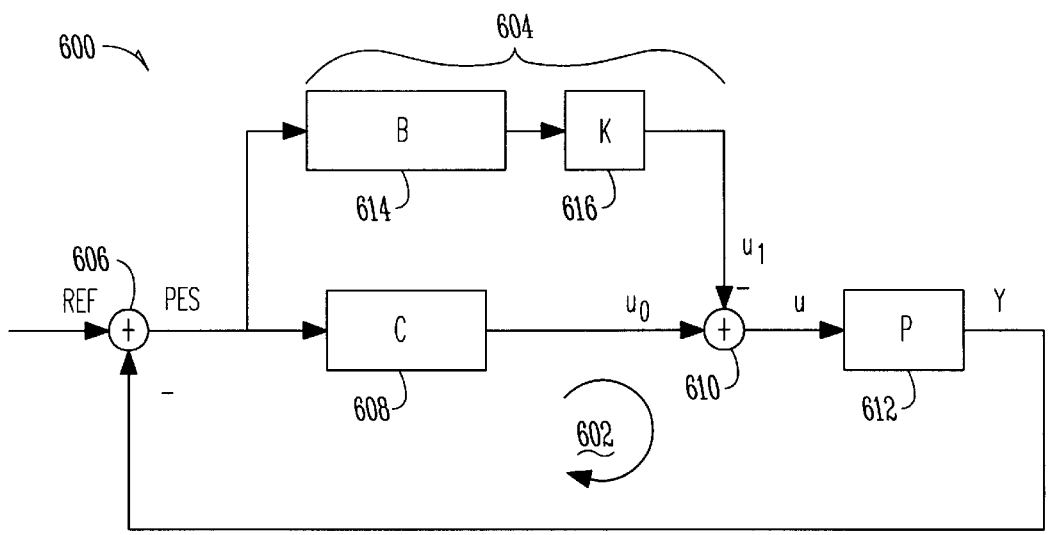
FIG. 6 is a schematic representation of a disc drive control loop which uses active damping to handle position error signal (PES) oscillation during seek settling.

Referring to FIG. 6, disc drive controller 502 executes a disc drive control loop 600 which uses active damping for handling resonance effects such as the PES oscillation that occurs during seek settling. Disc drive control loop 600 includes a servo control loop 602 as well as a feedforward compensation path 604. The active damping technique can be configured to handle resonance effects that occur during other types of movements of actuator assembly 408, such as during track following.

Servo control loop 602 includes a first difference element 606, a servo controller 608, a second difference element 610, and a power amplifier and plant 612 for driving actuator assembly 408. First difference element 606 subtracts a sensed position signal (Y) from a reference position signal (REF) to generate the position error signal (PES) for actuator arm 412. In one embodiment, the sensed position signal (Y) is determined using signals received from transducer 418. Servo controller 608 monitors the position error signal (PES) and generates a servo control signal ($U_0$) from the PES by performing conventional computations. Difference element 610 combines a feedforward compensation signal ($U_1$) from compensation path 604 with the servo control signal ($U_0$) from servo controller 608 to generate a control signal (U), which is applied to plant 612 with control effort $U=U_0-U_1$. In this embodiment, difference element 610 subtracts the feedforward compensation signal ($U_1$) from the servo control signal ($U_0$) to generate the control signal (U).

Feedforward compensation path 604 includes a bandpass filter 614, a gain element 616, and the second difference element 610. Bandpass filter 614 provides bandpass filtering of the position error signal (PES) and gain element 616 multiplies the output from bandpass filter 614 by a constant gain K to generate the feedforward compensation signal ($U_1$), which is subtracted from the servo control signal ($U_0$) by second difference element 610. Bandpass filter 614 has a center frequency which is set to the resonance frequency of the resonance mode of interest. For example, to handle arm bending mode resonance, the center frequency is set to about 1000 Hz, and more specifically to about 930 Hz for a particular disc drive. To handle coil bending mode resonance, the center frequency would be set to about 700 Hz. The center frequency would be set to other frequencies to handle other resonance modes. The closed-loop transfer function for disc drive control loop 600 is as follows:

$$\frac{Y}{REF} = \frac{(PC-PBK)}{(1+PC-PBK)} \quad (1)$$

Figure 7:
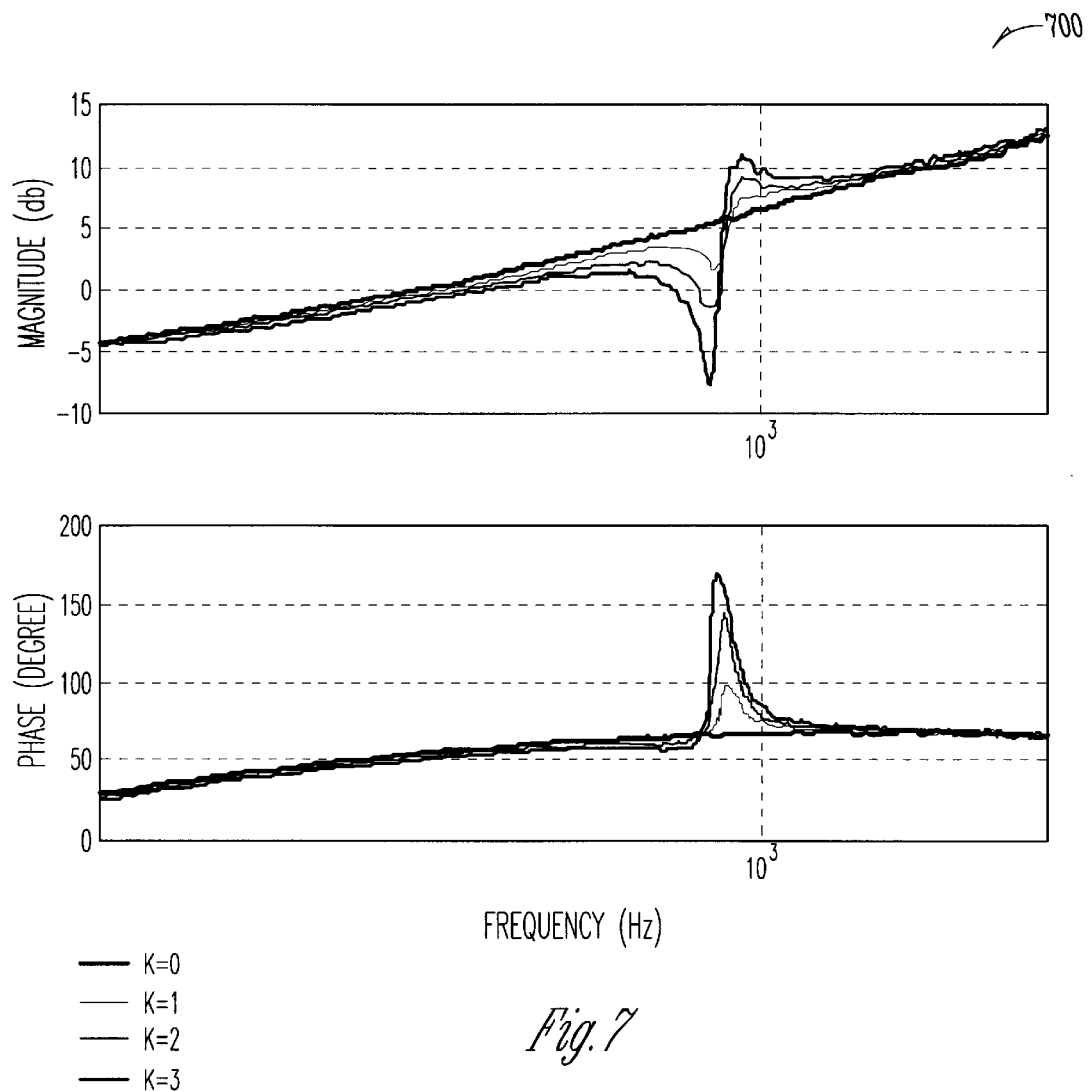
FIG. 7 are graphs illustrating the frequency response of the disc drive control loop shown in FIG. 6, which illustrates the effect of different values of gain K.

Gain K can be adjusted to achieve different performance. The frequency response $$\left(\frac{U}{PES} = \frac{(U_0 - U_1)}{PES}\right)$$

of the combined controller (servo control loop 602 and feedforward compensation path 604) is shown by graphs 700 in FIG. 7 for different values of gain K. Note that gain K=0 is equivalent to disabling the active damping, which can be verified by noting that the compensation signal ($U_1$) in FIG. 6 will be 0 if K=0. Also note that, if K has a non-zero value, the combined controller provides a phase advance around the center frequency of bandpass filter 614 (930 Hz), which compensates for the phase loss introduced at that frequency that was shown in FIG. 2. Thus, by setting gain K equal to a non-zero value, disc drive control loop 600 can compensate for the resonance effects caused by the arm bending mode resonance. By using other center frequencies for bandpass filter 614, disc drive control loop 600 can compensate for the resonance effects caused by other resonance modes.

Figure 8:
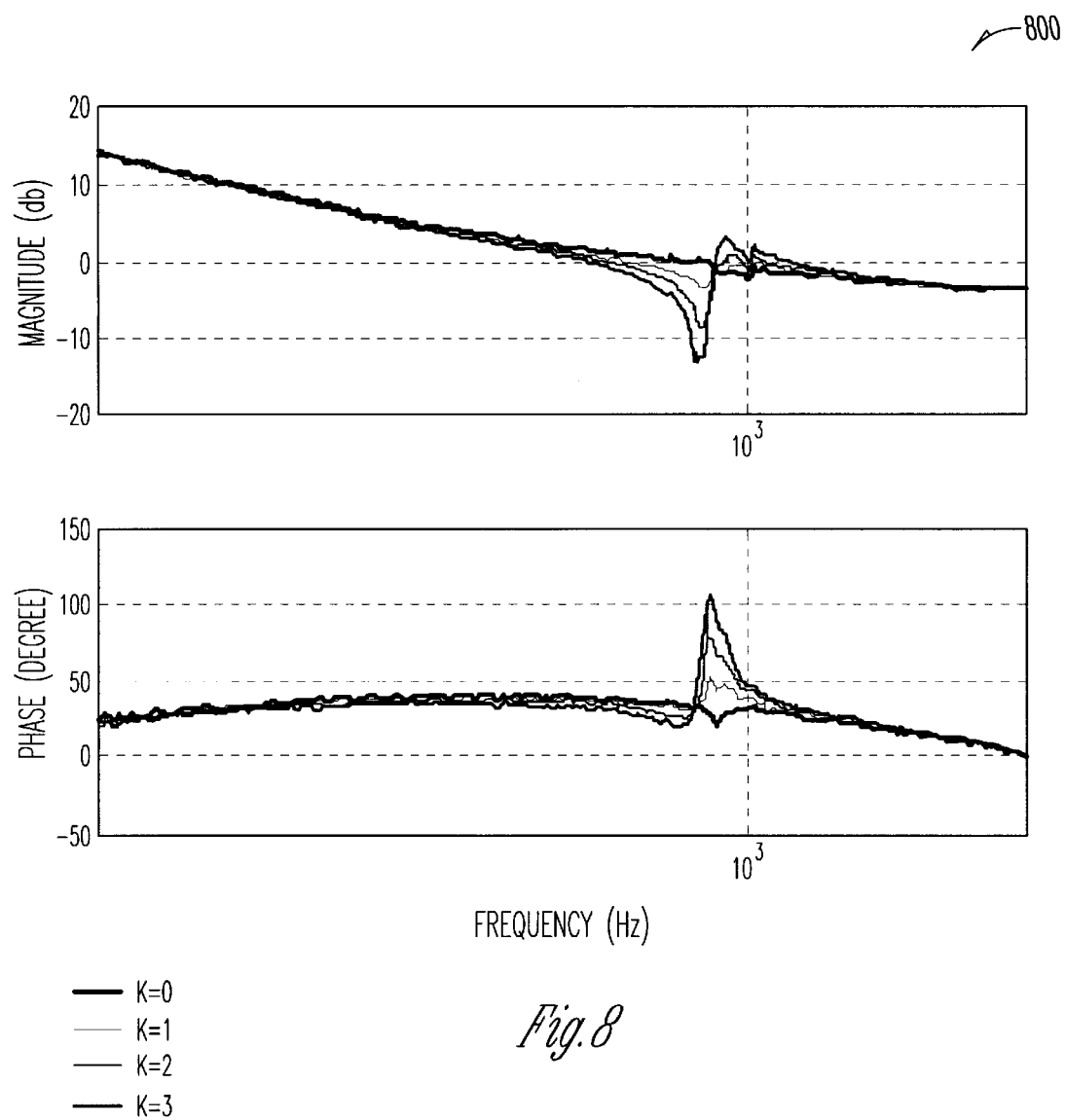
FIG. 8 is an open loop bode plot for the disc drive control loop shown in FIG. 6, which illustrates the effect of different values of gain K on gain and phase.
Figure 9:
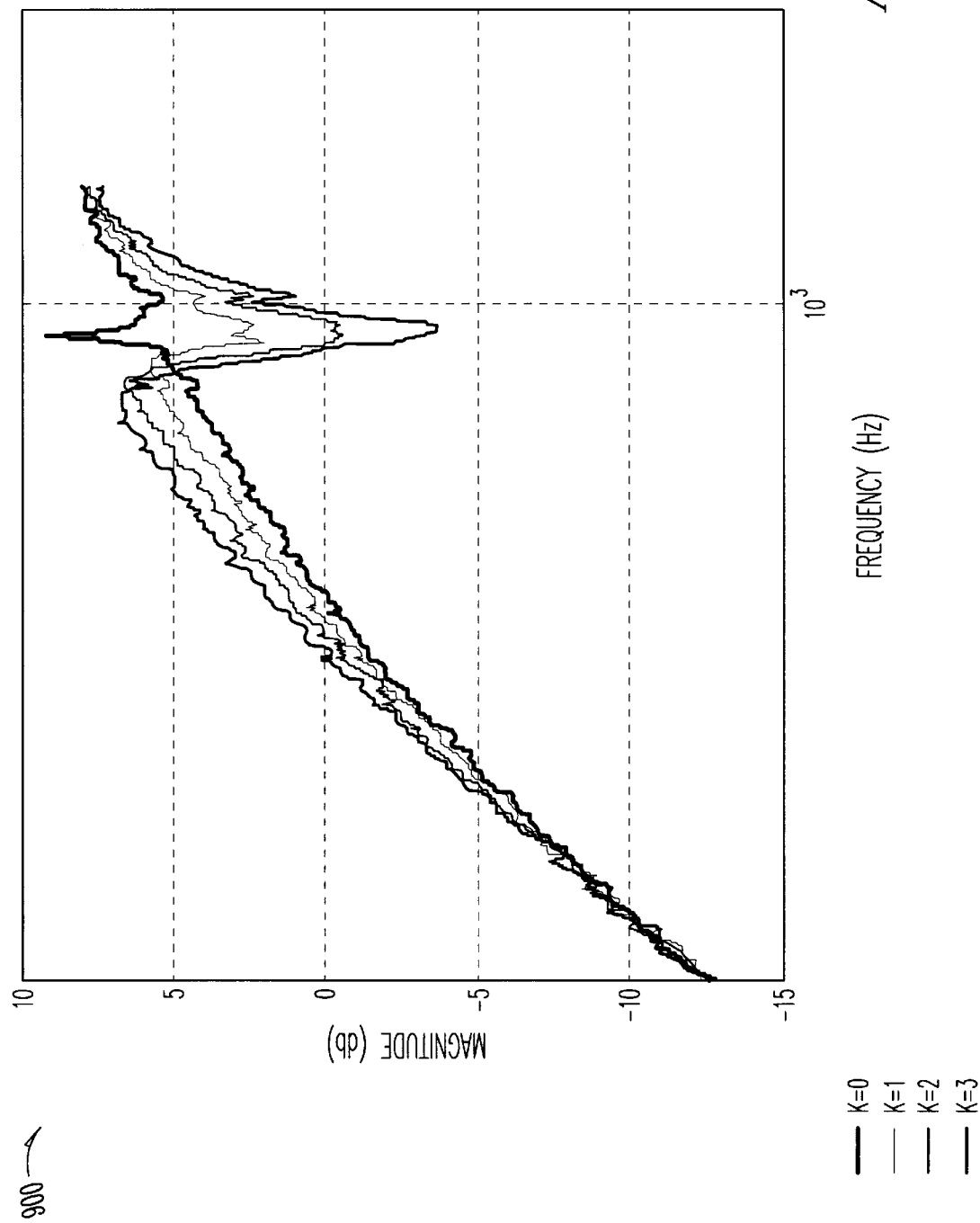
FIG. 9 is a sensitivity function plot for the disc drive control loop shown in FIG. 6, which illustrates the effect of different values of gain K on sensitivity.

The open loop bode plot 800 for different values of gain K are shown in FIG. 8, and sensitivity function plots 900 for these values of gain K are shown in FIG. 9. From FIGS. 8 and 9, it can be seen that the active damping that is provided by disc drive control loop 600 when gain K is non-zero will damp down the arm bending mode resonance. However, a "waterbed" effect can still be clearly observed.

To eliminate the waterbed effect, an optimal value of gain K is selected. If gain K is set to its optimal value, the oscillation or motion caused by the resonance mode will be removed from the VCM control signal 506. In other words, referring to FIG. 6 and equation (1), the value of PC−PBK (i.e., the numerator of equation (1)) will be equal to 0 at the arm bending mode resonance frequency of about 930 Hz when K is optimal. Since the gain of bandpass filter 614 at the center frequency of 930 Hz is equal to 1, the value of gain K is set to the same value as the gain of servo controller 608 at 930 Hz (i.e., K equals C at 930 Hz). The frequency response of servo controller 608 is shown in FIG. 7. It can be seen from this graph that, when K=0 (i.e., when feedforward compensation path 604 is effectively disabled), the magnitude of the gain at 930 Hz is about 6 dB (i.e., about 2). Thus, gain element 616 is configured to provide a constant gain K of about 6 dB (about 2) at 930 Hz.

In one embodiment, gain element 616 provides a constant gain K of about 6 dB over a broad frequency range, including the resonance frequency of about 930 Hz. In another embodiment, gain element 616 provides a constant gain K of about 6 dB within a range of frequencies passing through bandpass filter 614, and provides one or more other gains K at other frequencies which, when multiplied by the output of bandpass filter 614, is low enough not to affect control signal U. For example, if the output from bandpass filter 614 is at a very low level for a frequency outside of the band of frequencies passing filter 614, then the gain K provided by element 616 at that frequency can vary substantially without adverse affect on control signal (U).

Figure 10:
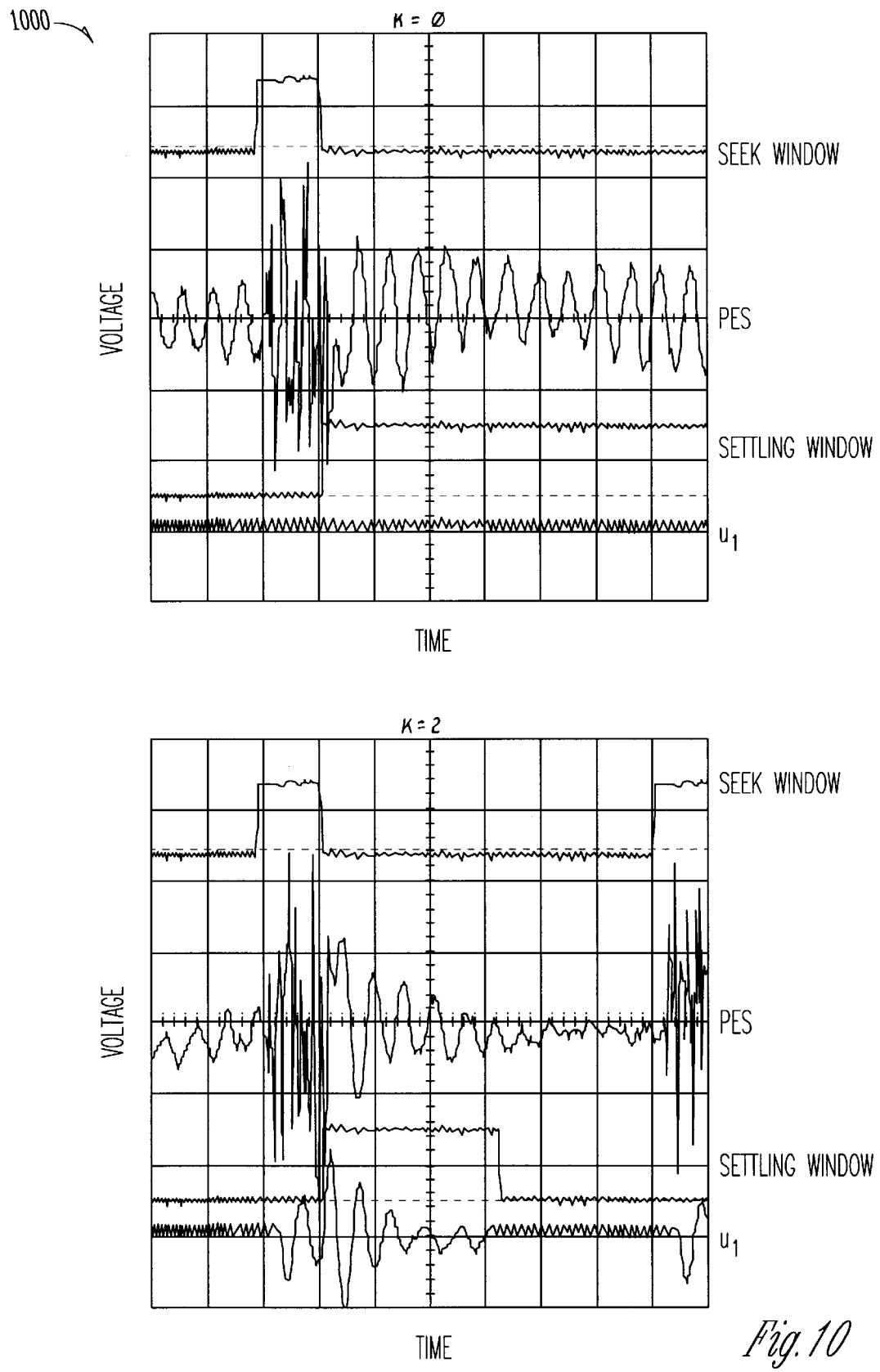
FIG. 10 are graphs comparing the position error signal during seek settling for the disc drive control loop of FIG. 6, with gain K set to 0 (top) and 2 (bottom)

The top and bottom graphs 1000 shown in FIG. 10 provide a comparison of the position error signal (PES) during seek settling for disc drive 400, with gain K set to 0 (top) and 2 (bottom). Since gain K=0 is equivalent to disabling the active damping scheme, FIG. 10 effectively compares the position error signal (PES) both with and without the active damping scheme. From top to bottom, the four traces in each of the graphs represent the seek window, the position error signal (PES), the settling window, and the feedforward compensation signal ($U_1$). The feedforward compensation signal ($U_1$) for the top graph remains at 0 (i.e., active damping is disabled) while the same signal ($U_1$) for the bottom graph provides compensation. By comparing the graphs, it can be seen that the oscillation of the position error signal (PES) is quickly damped down with K=2 in comparison to K=0, and that the settling time is reduced dramatically. In fact, the bottom graph shows the start of a second seeking cycle, while the top graph has not yet ended its settling window.

The chart 1100 of FIG. 11 shows measured write settling access times for disc drive 400, with the gain K being set to different values (i.e., 0, 1 and 2). The measurements were performed at a known resonant zone, and the write settling access time was measured for a short seek with a certain seek length. For each configuration (each value of K), four measurements were performed for consistency. It can be seen that, with gain K=0 (i.e., with active damping effectively disabled), the average write settling access time was about 17.5 msec. With gain K=1, the average write settling access time was decreased to about 11.3 msec. Finally, with gain K=2, the average write settling access time was further decreased to about 9.0 msec. While these results suggest that gain K should be set equal to 2 to minimize the write settling access time, in accordance with the analysis set forth above, it will be apparent to a person of skill in the art that other values of K may be used. These other values may be determined as the result of theoretical analysis or of testing.

Figure 12:
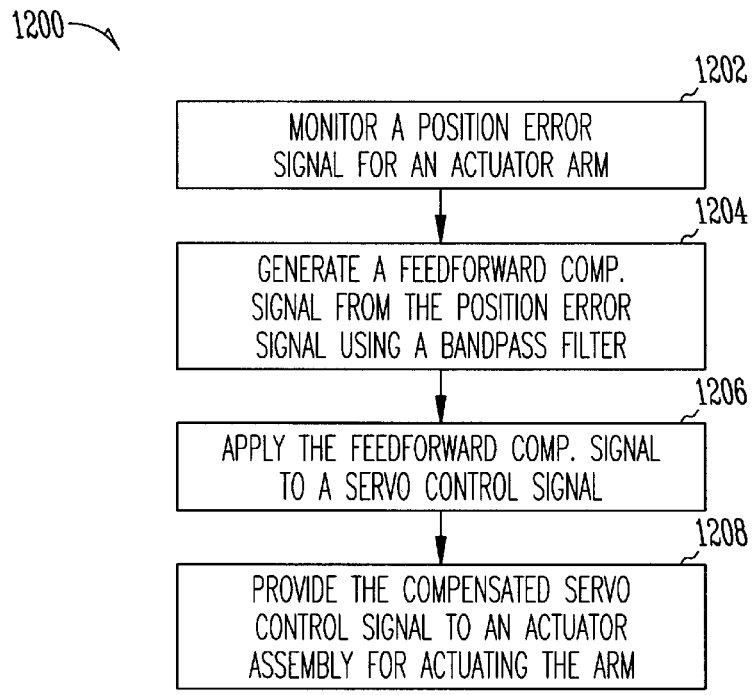
FIG. 12 is flow diagram showing a process for handling resonance effects in a disc drive using active damping according to an embodiment of the invention.

Referring to FIG. 12, a process 1200 for handling resonance effects in a disc drive using active damping according to one embodiment of the present invention includes the steps of monitoring a position error signal (PES) for an actuator arm (step 1202), generating a feedforward compensation signal from the position error signal (PES) using a bandpass filter (step 1204), applying the compensation signal to a servo control signal (step 1206), and providing the compensated servo control signal to an actuator assembly for actuating the actuator arm (step 1208). Process 1200 may also include the step of setting the center frequency of the bandpass filter to a known or predetermined resonance frequency of a particular resonance mode.

Advantageously, the inventive method and apparatus disclosed herein use active damping for handling resonance effects in disc drives. This active damping approach can effectively handle resonance effects which occur at either high or low frequencies without adversely affecting the access times for the disc drives, and can handle structural resonance frequencies that may exist at or near the servo open loop bandwidth of the disc drives, including both arm and coil bending mode resonances.

Figure 13:
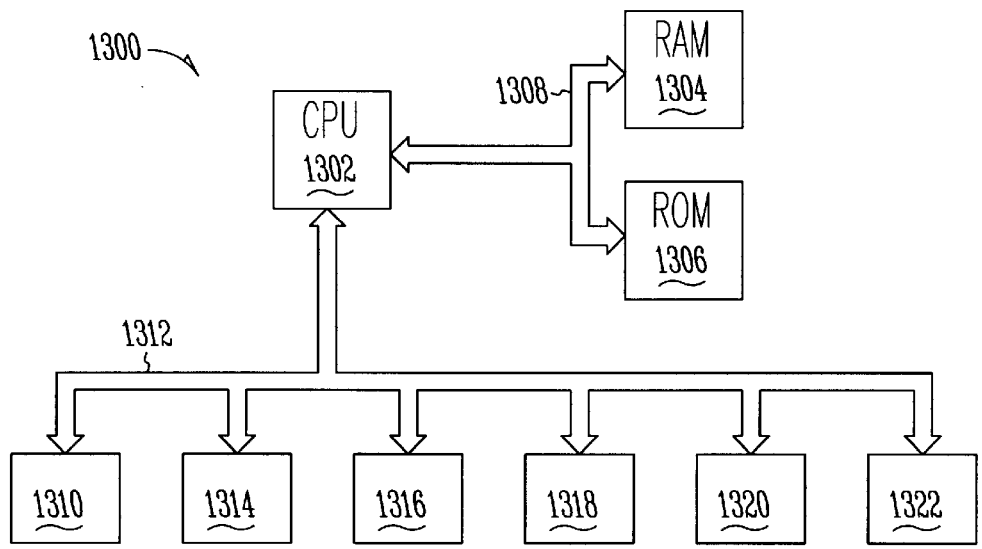
FIG. 13 is a schematic view of a computer or information handling system having one or more disc drives that use active damping to handle resonance effects.

Referring to FIG. 13, a computer system 1300 includes one or more disc drives that use active damping for handling resonance effects. System 1300, which may be referred to as an electronic system or as an information handling system, includes a central processing unit (CPU) 1302, a random access memory (RAM) 1304, a read only memory (ROM) 1306 and a system bus 1308 for communicatively coupling CPU 1302 with RAM 1304 and ROM 1306. System 1300 includes one or more disc drive devices 1310 (one shown in FIG. 13) including the active damping feature described above, and an input/output (I/O) bus 1312 for communicatively coupling CPU 1302 with disc drive device(s) 1310. Any type of disc drive may use the method for handling resonance effects using active damping as described above. System 1300 may also include other peripheral devices, such as devices 1314–1322, attached to bus 1312. Devices 1314–1322 may include other disc drives, magneto optical drives, floppy disc drives, monitors, keyboards and other peripherals.

Conclusion

A method 1200 of handling a resonance effect on a disc drive 400 includes monitoring a position error signal (PES) for an actuator arm 412 of a disc drive 400 (step 1202), generating a feedforward compensation signal ($U_1$) from the position error signal (PES) using a bandpass filter 614 (step 1204) having a center frequency that is set to a predetermined resonance frequency for the disc drive, and applying the feedforward compensation signal ($U_1$) to a servo control signal ($U_0$) (step 1206). In one embodiment, monitoring step 1202 includes receiving a sensed position signal (Y) from a transducer 418 coupled to actuator arm 412, and subtracting the sensed position signal (Y) from a reference position signal (REF). Bandpass filter 614 has a center frequency set to a predetermined resonance frequency that appears during seek settling and/or track following. Generating step 1204 includes using a gain element 616 with bandpass filter 614 to generate the feedforward compensation signal ($U_1$). Gain element 616 provides a constant gain equal to the gain of the controller 608 which generates the servo control signal ($U_0$) at the predetermined resonance frequency. Applying step 1206 includes subtracting the feedforward compensation signal ($U_1$) from the servo control signal ($U_0$). In one embodiment, method 1200 also includes providing the compensated servo control signal ($U=U_0-U_1$) to an actuator assembly 408 for actuating the actuator arm 412 (step 1208).

A disc drive device 400 includes a base 402, a disc 428 rotatably attached to the base, an actuator assembly 408 with an arm 412 for carrying a head 416, 418 in a transducing relation with respect to disc 428 in response to a control signal (U), and a controller 502 coupled to actuator assembly 408 for monitoring a position error signal (PES) for arm 412 and for generating the control signal (U). Controller 502 includes a servo controller 608 that monitors the position error signal (PES) for actuator arm 412 and generates a servo control signal ($U_0$) from the position error signal (PES), and a feedforward compensation element 604, including a bandpass filter 614, that filters the position error signal (PES) to generate a compensation signal ($U_1$) and combines the compensation signal ($U_1$) with the servo control signal ($U_0$) to generate the control signal (U). Bandpass filter 614 has a center frequency that is set to a predetermined resonance frequency of disc drive device 400. In one embodiment, servo controller 608 monitors the position error signal by receiving a sensed position signal (Y) from transducer head 416, 418 and subtracting the sensed position signal (Y) from a reference position signal (REF). The center frequency of bandpass filter 614 is set to a predetermined resonance frequency that may appear during seek settling and/or track following. Feedforward compensation element 604 also includes a gain element 616 which provides a constant gain equal to the gain of servo controller 608 at the resonance frequency. The feedforward compensation element also includes a subtraction element 610 for subtracting the compensation signal ($U_1$) from the servo control signal ($U_0$) to generate the control signal (U).

An apparatus 502 for handling a resonance effect on a disc drive 400 includes means for monitoring a position error signal (PES) for an actuator arm 412, means for generating a feedforward compensation signal ($U_1$) from the position error signal (PES) using a bandpass filter 614 having a center frequency that is set to a predetermined resonance frequency of the disc drive, and means for providing the feedforward compensation signal ($U_1$) to a servo control signal $U_0$.

A disc drive 400 includes a base 402 with an actuator arm 412 and at least one disc 428 rotatably attached thereto. Actuator arm 412 carries a head 416, 418 in a transducing relation with respect to disc 428. Disc drive 400 also includes means 502 for handling a resonance effect in disc drive 400 using active damping.

It is to be understood that the above description is intended to be illustrative, and not restrictive. Many other embodiments will be apparent to those of ordinary skill in the art upon reviewing the above description. The scope of the present invention should, therefore, be determined with reference to the appended claims, along with the full scope of equivalents to which such claims are entitled.

What is claimed is:

1. A method comprising steps of:
   (a) monitoring a position error signal for an arm of an apparatus;
   (b) generating a feedforward compensation signal from the position error signal independent of a servo control signal using a bandpass filter, the bandpass filter having a center frequency that is set to a predetermined resonance frequency of the apparatus; and (c) applying the feedforward compensation signal to the servo control signal.

2. The method of claim 1, wherein the arm is an actuator arm and wherein the monitoring step (a) includes (a)(i) receiving a sensed position signal from a transducer coupled to the actuator arm.

3. The method of claim 2, wherein the monitoring step (a) further includes (a)(ii) subtracting the sensed position signal from a reference position signal.

4. The method of claim 1, wherein the predetermined resonance frequency is a known resonance frequency of the apparatus that appears during seek settling.

5. The method of claim 1, wherein the predetermined resonance frequency is a known resonance frequency of the apparatus that appears during track following.

6. The method of claim 1, wherein the generating step (b) includes (b)(i) using a gain element with the bandpass filter to generate the compensation signal.

7. The method of claim 6, wherein the gain element provides a constant gain.

8. The method of claim 6, wherein the servo control signal is generated by a controller having a controller gain at the predetermined resonance frequency, and the gain element provides the controller gain at the predetermined resonance frequency.

9. The method of claim 1, wherein the applying step (c) includes (c)(i) subtracting the feedforward compensation signal from the servo control signal.

10. The method of claim 1, further including a step of:

(d) providing the compensated servo control signal to an actuator assembly for actuating the arm.

11. An apparatus comprising:

an arm;

a servo controller configured to monitor a position error signal for the arm and to generate a servo control signal from the position error signal; and a feedforward compensation element including a bandpass filter configured to filter the position error signal to generate a compensation signal independent of the servo control signal and to combine the compensation signal with the servo control signal to generate a control signal for the arm, wherein the bandpass filter has a center frequency set to a predetermined resonance frequency of the apparatus.

12. The disc drive device of claim 11, wherein the servo controller monitors the position error signal by receiving a sensed position signal from a transducer head.

13. The disc drive device of claim 11, wherein the servo controller monitors the position error signal by subtracting a sensed position signal from a reference signal.

14. The disc drive device of claim 11, wherein the predetermined resonance frequency appears during at least one of seek settling and track following operations.

15. The disc drive device of claim 11, wherein the feedforward compensation element further includes a gain element, the gain element providing a constant gain.

16. The disc drive device of claim 15, wherein the servo controller provides a controller gain at the predetermined resonance frequency, and the gain element also provides the controller gain at the predetermined resonance frequency.

17. The disc drive device of claim 11, wherein the feedforward compensation element further includes a subtraction element for subtracting the compensation signal from the servo control signal to generate the control signal.

18. A method comprising steps of:

(a) monitoring a position error signal;

(b) generating a compensation signal from the position error signal using a bandpass filter and a gain element, the bandpass filter having a center frequency set to a resonance frequency and (c) applying the compensation signal to a servo control signal.

19. An apparatus comprising:

a servo controller coupled to receive a position error signal and configured to generate a control signal; and at least one bandpass filter coupled to receive the position error signal and configured to generate a compensation signal independent of the control signal, wherein the compensation signal is to be applied to the control signal.

* * * * *